(No Model.)
H. H. WING.
MANUFACTURE OF PHOSPHORUS.
No. 452,821. Patented May 26, 1891.
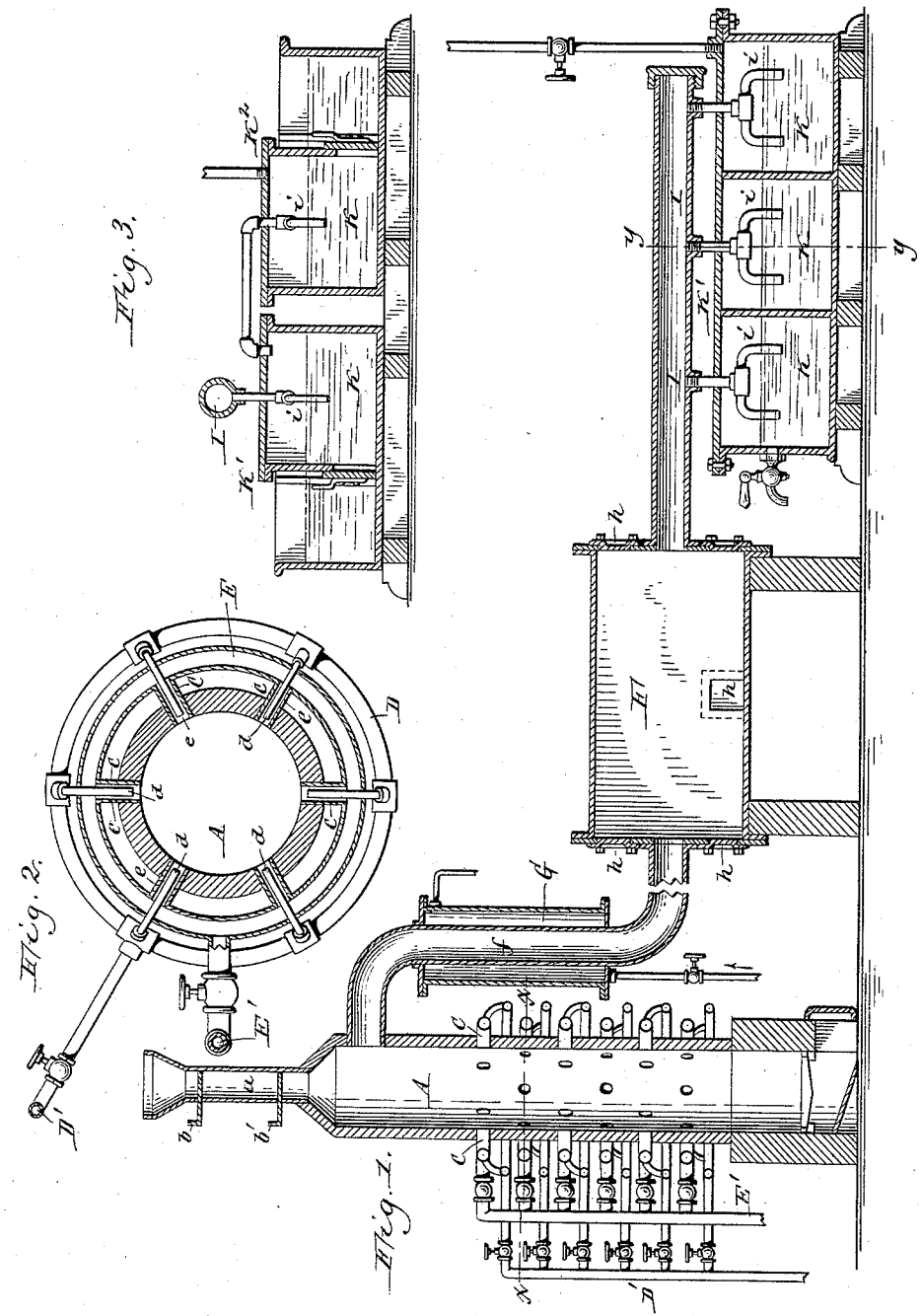

UNITED STATES PATENT OFFICE.

HERBERT H. WING, OF BUFFALO, NEW YORK.

MANUFACTURE OF PHOSPHORUS.

SPECIFICATION forming part of Letters Patent No. 452,821, dated May 26, 1891.

Application filed September 19, 1890. Serial No. 365,463. (No model.)

*To all whom it may concern:*

Be it known that I, HERBERT H. WING, a citizen of the United States, residing at the city of Buffalo, in the county of Erie and State of New York, have invented a new and useful Improvement in the Manufacture of Phosphorus, of which the following is a specification.

This invention has for its object the production of phosphorus in such manner that a large proportion of red phosphorus is produced in a simple and inexpensive manner.

In the accompanying drawings, Figure 1 is a sectional elevation of an apparatus by which my invention can be practiced. Fig. 2 is a horizontal section, on an enlarged scale, in line $x\ x$, Fig. 1. Fig. 3 is a cross-section in line $y\ y$, Fig. 1.

Like letters of reference refer to like parts in the several figures.

In practicing my invention I mix together very finely-ground phosphate rock—for instance, calcium phosphate—and any silicious material—such, for instance, as clay or serpentine—also finely ground. The mixture of the phosphate with the silicate is dampened and molded into small balls about two inches in diameter. These balls are dried and then calcined at an extremely high temperature. To obtain this high temperature I prefer to employ a cupola-furnace A, which is preferably heated with gaseous fuel and a hot-air blast. This furnace is provided at the top with a feed-pipe $a$, having two slides $b\ b'$, and at the bottom with a dumping-grate or other device by which the calcined mass can be removed. The above-described balls are placed in the furnace in layers, and between the layers of balls is placed coke or coal, whereby incandescent carbon is furnished for the reduction of the phosphoric-acid fumes. The furnace is provided with radial gas-burners C, arranged in horizontal rows and composed each of an internal air-pipe $d$ and a surrounding gas-pipe $e$, which are supplied with air and gas, respectively, from horizontal annular pipes D E and vertical supply-pipes D' E'. The supply of gas and air is so regulated as to produce a reducing action as distinguished from an oxidizing-flame. At the high temperature of calcination the silica in the silicate expels the phosphoric acid from the phosphate. The acid is driven out in the form of anhydride $P_2O_5$. The action of the reducing-flame, together with the action of the incandescent carbon, reduces the phosphoric anhydride to phosphorus, the oxygen combining with the carbon. I prefer to use solid carbonaceous matter—such as coal or coke—to produce this reducing action; but it may be produced in a less desirable manner by the gaseous fuel alone under a proper limitation of the air-supply. Liquid or solid fuel may be employed instead of gaseous fuel, if desired; but I prefer gaseous fuel because it produces more concentrated fumes. The fumes of phosphorus pass from the furnace through a pipe $f$ to a depositing-chamber F, in which the temperature of the fumes is reduced to about 500° Fahrenheit, at which temperature the fumes change to the form of red phosphorus, which is deposited. This reduction of the temperature can be effected by locating the depositing-chamber at such a distance from the furnace that the radiation through the iron pipe $f$ and the iron walls of the depositing-chamber produces the desired cooling; or the conducting-pipe $f$ can be surrounded with a water-jacket G, by which the fumes are cooled.

The depositing-chamber is provided with a number of doors or man-holes $h$, through which the red phosphorus is removed. In order not to interrupt the operation of the apparatus, I preferably employ two of these depositing-chambers, arranged side by side and connected with the inlet and outlet pipes by suitable valves, so that one of the chambers can be in operation while the deposited phosphorus is being removed from the other.

The fumes which are not changed in the depositing-chamber to red phosphorus pass through the pipe I and issue from depending branch pipes $i$ into water-chambers K, in which the mouths of these pipes are submerged. These chambers are of the construction usually employed in the manufacture of phosphorus, and two or more series K' K² of these chambers are employed as may be necessary to condense the fumes completely before the waste gases are permitted to escape. The yellow phosphorus is deposited in these chambers and removed therefrom in the usual manner.

The phosphate and silicate are preferably mixed in such proportion that the resulting calcined mass shall have the composition of lime about sixty per cent., silica about twenty-two per cent., and alumina about ten per cent. To obtain this result with phosphate rock and clay, one hundred parts of phosphate rock are mixed with 46.29 parts of clay; but these proportions may be varied as the compositions of the materials vary. When these proportions are employed, the calcined mass which is removed from the furnace has the composition of hydraulic or Portland cement and can be ground for use as cement, thus forming a valuable by-product.

I am aware that it is not new to make phosphorus by calcining a mixture of a phosphate and silica by a reducing-flame, and I do not broadly claim this method of manufacture.

I claim as my invention—

1. The herein-described method of making red phosphorus, which consists in calcining a mixture of a phosphate and a silicate by a reducing-flame, whereby phosphoric anhydride is expelled and reduced, and conducting the fumes through a depositing-chamber which is kept at a temperature of about 500° Fahrenheit and in which the red phosphorus is deposited, substantially as set forth.

2. The herein-described method of making red and yellow phosphorus simultaneously, which consists in calcining a mixture of a phosphate and a silicate by a reducing-flame, whereby phosphoric anhydride is expelled and reduced, conducting the fumes through a depositing-chamber which is kept at a temperature of about 500° Fahrenheit and in which the red phosphorus is deposited, and conducting the remaining fumes through water-chambers in which the yellow phosphorus is condensed, substantially as set forth.

Witness my hand this 17th day of September, 1890.

HERBERT H. WING.

Witnesses:
CARL F. GEYER,
F. C. GEYER.